(12) United States Patent
Palum et al.

(10) Patent No.: US 7,953,225 B2
(45) Date of Patent: May 31, 2011

(54) MOBILE WIRELESS COMMUNICATIONS DEVICE WITH SOFTWARE INSTALLATION AND VERIFICATION FEATURES AND RELATED METHODS

(75) Inventors: Lloyd Palum, Rochester, NY (US); Robert Brutovski, Churchville, NY (US); Chris Rericha, Rochester, NY (US)

(73) Assignee: Harris Corporation, Melbourne, FL (US)

( * ) Notice: Subject to any disclaimer, the term of this patent is extended or adjusted under 35 U.S.C. 154(b) by 1359 days.

(21) Appl. No.: 11/256,543

(22) Filed: Oct. 21, 2005

(65) Prior Publication Data

US 2007/0094508 A1    Apr. 26, 2007

(51) Int. Cl.
*G06F 21/00* (2006.01)
*H04L 9/00* (2006.01)

(52) U.S. Cl. ........................................ 380/269; 713/181
(58) Field of Classification Search .................. 713/165, 713/167, 176, 178, 180, 188, 2, 160, 181, 713/168; 380/217, 249; 717/168, 174; 726/22, 726/26, 30; 709/203, 206, 224
See application file for complete search history.

(56) References Cited

U.S. PATENT DOCUMENTS

| | | | | |
|---|---|---|---|---|
| 5,724,425 A * | 3/1998 | Chang et al. | | 705/52 |
| 5,757,919 A | 5/1998 | Herbert et al. | | 380/25 |
| 6,360,334 B1 | 3/2002 | Kavanagh et al. | | 714/38 |
| 6,708,274 B2 | 3/2004 | Herbert et al. | | 713/190 |
| 6,931,548 B2 | 8/2005 | O'Connor | | 713/200 |
| 6,948,069 B1 * | 9/2005 | Teppler | | 713/178 |
| 2004/0264403 A1 * | 12/2004 | Fette et al. | | 370/328 |
| 2005/0055689 A1 * | 3/2005 | Abfalter et al. | | 717/174 |
| 2005/0120209 A1 * | 6/2005 | Kwon et al. | | 713/161 |
| 2005/0132357 A1 * | 6/2005 | Shell et al. | | 717/174 |
| 2005/0216907 A1 | 9/2005 | Dive-Reclus | | 717/174 |

OTHER PUBLICATIONS

*Software Communications Architecture (SCA)*, Technical Overview, available at www.jtrs.army.mil/sections/technicalinformation/technical_SCA.html.
*Software Defined Radios*, Technical Overview, available at www.jtrs.army.mil/sections/technicalinformation/technical_SDR.html.
DSS Signature Suite—Version 1.0, W3C, 1998, available at www.w3.org/TR/1998/REC-Dsig-label/DSS-1_0.

* cited by examiner

*Primary Examiner* — Gilberto Barron, Jr.
*Assistant Examiner* — Izunna Okeke
(74) *Attorney, Agent, or Firm* — Allen, Dyer, Doppelt, Milbrath & Gilchrist, P.A.

(57) ABSTRACT

A mobile wireless communications device which may include a housing, an antenna carried by the housing, a wireless transceiver carried by the housing and connected to the antenna, and at least one memory for storing a compressed software file, a digest of an uncompressed version of the software file, and a digital signature of the compressed software file and the digest generated based upon a private key. The device may further include a processor carried by the housing and cooperating with the wireless transceiver for performing wireless communications. The processor may also cooperate with the at least one memory for authenticating the compressed software file based upon the digital signature and a public key corresponding to the private key. Upon authentication of the compressed software file, the processor uncompresses the compressed software file. The uncompressed software file may then be re-authenticated at a time after installation based upon the digest.

14 Claims, 4 Drawing Sheets

MOBILE WIRELESS COMMUNICATIONS DEVICE WITH SOFTWARE INSTALLATION AND VERIFICATION FEATURES AND RELATED METHODS

FIELD OF THE INVENTION

The present invention relates to the field of communications systems, and, more particularly, to software file management and processing in wireless communications devices and related methods.

BACKGROUND OF THE INVENTION

With advances in processing capabilities and programming technologies, software defined mobile wireless communications devices (e.g., radios) continue to increase in popularity. Rather than relying upon hardware and circuitry components to perform frequency, modulation, bandwidth, security, and/or waveform functions, these functions are instead performed by software modules or components in a software radio. That is, with a software radio analog signals are converted into the digital domain where the above-noted functions are performed using digital signal processing based upon software modules.

Because most of the functions of the radio are controlled by software, software radios may typically be implemented with relatively standard processor and hardware components. This may not only reduce device hardware costs, but it also provides greater flexibility in upgrading the device since new communications waveform modules can be uploaded to the device relatively easily and without the need to interchange new hardware components.

One particular class of software radios which takes advantage of the above-described advantages is the Joint Tactical Radio (JTR). The JTR includes relatively standard radio and processing hardware along with the appropriate waveform software modules for the communication waveforms the radio will utilize. JTRs also utilize operating system software that conforms with the Software Communications Architecture (SCA). The SCA is an open architecture framework that specifies how hardware and software components are to interoperate so that different manufacturers and developers can readily integrate their respective components into a single device.

Still another class of mobile wireless communications devices that increasingly use software components for communicating via different waveforms or standards is cellular communication devices. That is, many cellular devices are now designed to operate with more than one of the numerous cellular standards that are used throughout the world, such as the Global System for Mobile Communications (GSM) and Personal Communications Services (PCS), for example.

Despite the numerous advantages of software radios, one challenge presented by such devices is that of verifying that the software components being installed on the device are from a trusted or authentic source. Moreover, once installed, it may also be important to verify that the software has not been altered by malicious viruses, worms, or other means that may compromise the security of the device. While this is particularly important in personal communications devices such as personal digital assistants (PDAs) that may include sensitive financial and personal information, it is especially important in devices such as JTRs that may be used to transmit classified or highly sensitive data.

Various approaches have been developed in an attempt to ensure the integrity of software installed on a computing device. One such example is disclosed in U.S. Patent Publication No. 2005/0216907 to Dive-Reclus directed to a mobile wireless device operable to install code on a removable medium, in which the device is programmed to calculate and store a digest of the code into a persistent non-removable store inside the device. When the removable medium is plugged back into the device and the code is invoked, the device recalculates a digest from the code to be loaded from the removable medium and compares it with the digest stored inside the persistent non-removable store. If they do not match, the code is deemed to have been tampered with and not trustworthy. The digest may be a hash value or other unique value.

Still another approach is set for in U.S. Pat. No. 6,708,274 to Herbert et al. This patent discloses a method and system for maintaining integrity and confidentiality of pages paged to an external storage unit from a physically secure environment. When an outgoing page is exported from a physically secure environment to an insecure environment, an integrity check value is generated and stored for the outgoing page. In one embodiment, this is done by taking a one-way hash of the page using a one-way hash function. The outgoing page is then encrypted using an encryption algorithm. The encrypted outgoing page is then exported to the external storage unit.

Despite the benefits of such approaches, further improvements and functionality may be desirable for installing and verifying software components or files on mobile wireless communications devices.

SUMMARY OF THE INVENTION

In view of the foregoing background, it is therefore an object of the present invention to provide a mobile wireless communications device with enhanced software file installation and verification features and related methods.

This and other objects, features, and advantages in accordance with the present invention are provided by a mobile wireless communications device which may include a housing, an antenna carried by the housing, a wireless transceiver carried by the housing and connected to the antenna, and at least one memory for storing a compressed software file, a digest of an uncompressed version of the software file, and at least one digital signature of the compressed software file and the digest generated based upon a private key. The device may further include a processor carried by the housing and cooperating with the wireless transceiver for performing wireless communications. More particularly, the processor may also cooperate with the at least one memory for authenticating the compressed software file based upon the digital signature and a public key corresponding to the private key. Upon authentication of the compressed software file, the processor uncompresses the compressed software file. The uncompressed software file may then advantageously be re-authenticated at a time after installation based upon the stored digest.

By way of example, the digest of the uncompressed version of the software file may be generated based upon a one-way algorithm, such as a hashing algorithm. Also, the processor may operate in accordance with a Software Communications Architecture (SCA). The software file may be a radio frequency (RF) waveform file, a cryptographic file, an operating system (OS) file, etc., for example. Furthermore, the processor may include a secure cryptographic module for performing the authentication and re-authentication.

A method aspect of the invention is for installing and verifying software on a mobile wireless communications device. The method may include storing a compressed software file, a digest of an uncompressed version of the software file, and a digital signature of the compressed software file and the digest generated based upon a private key. Furthermore, the compressed software file may be authenticated based upon the digital signature and a public key corresponding to the private key. The method may further include, upon authentication, uncompressing the compressed software file, and re-authenticating the uncompressed software file at a time after installation based upon the stored digest.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Figure 1:
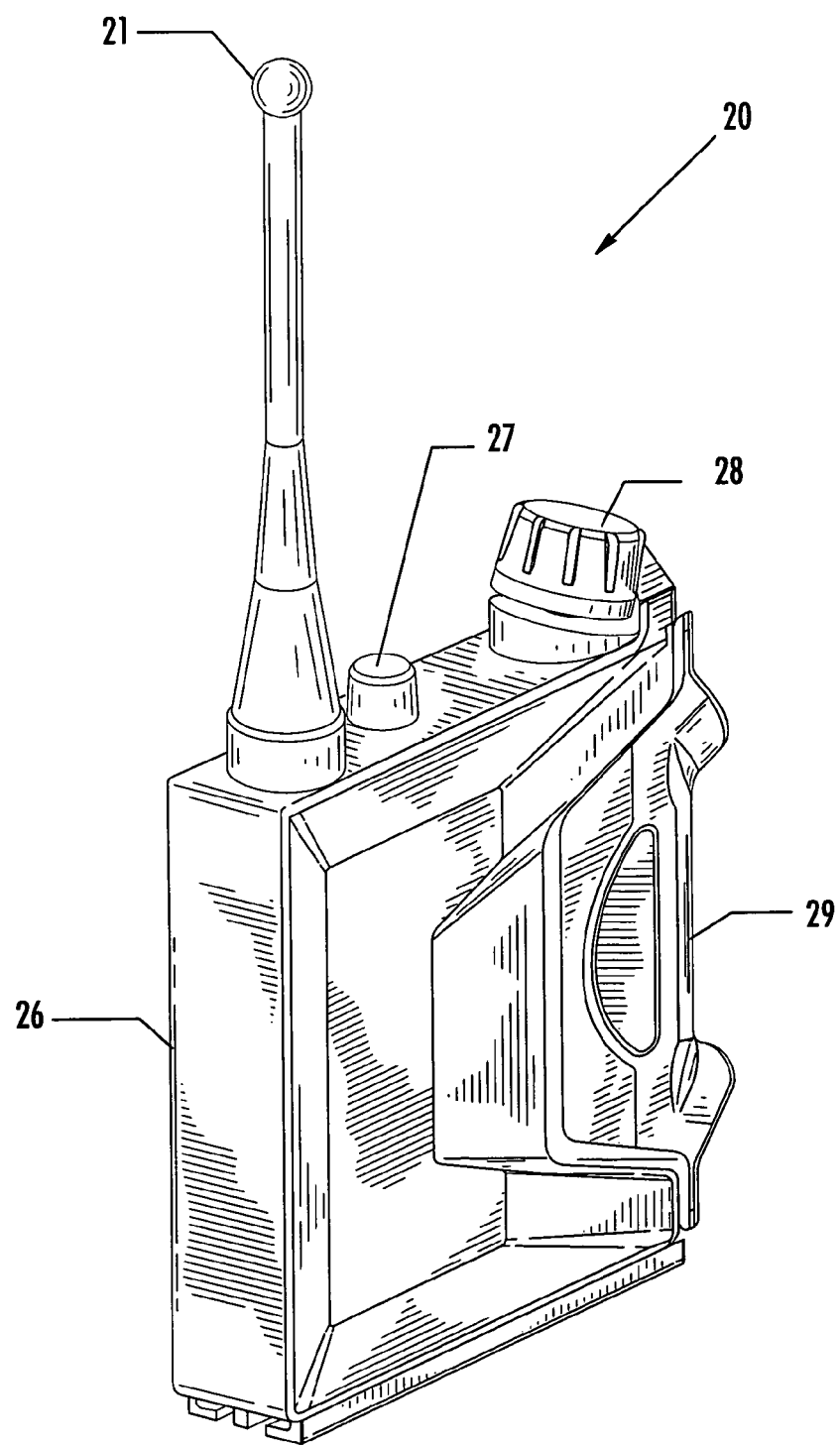
FIG. 1 is a perspective view of a wireless communications device in accordance with the present invention.
Figure 2:
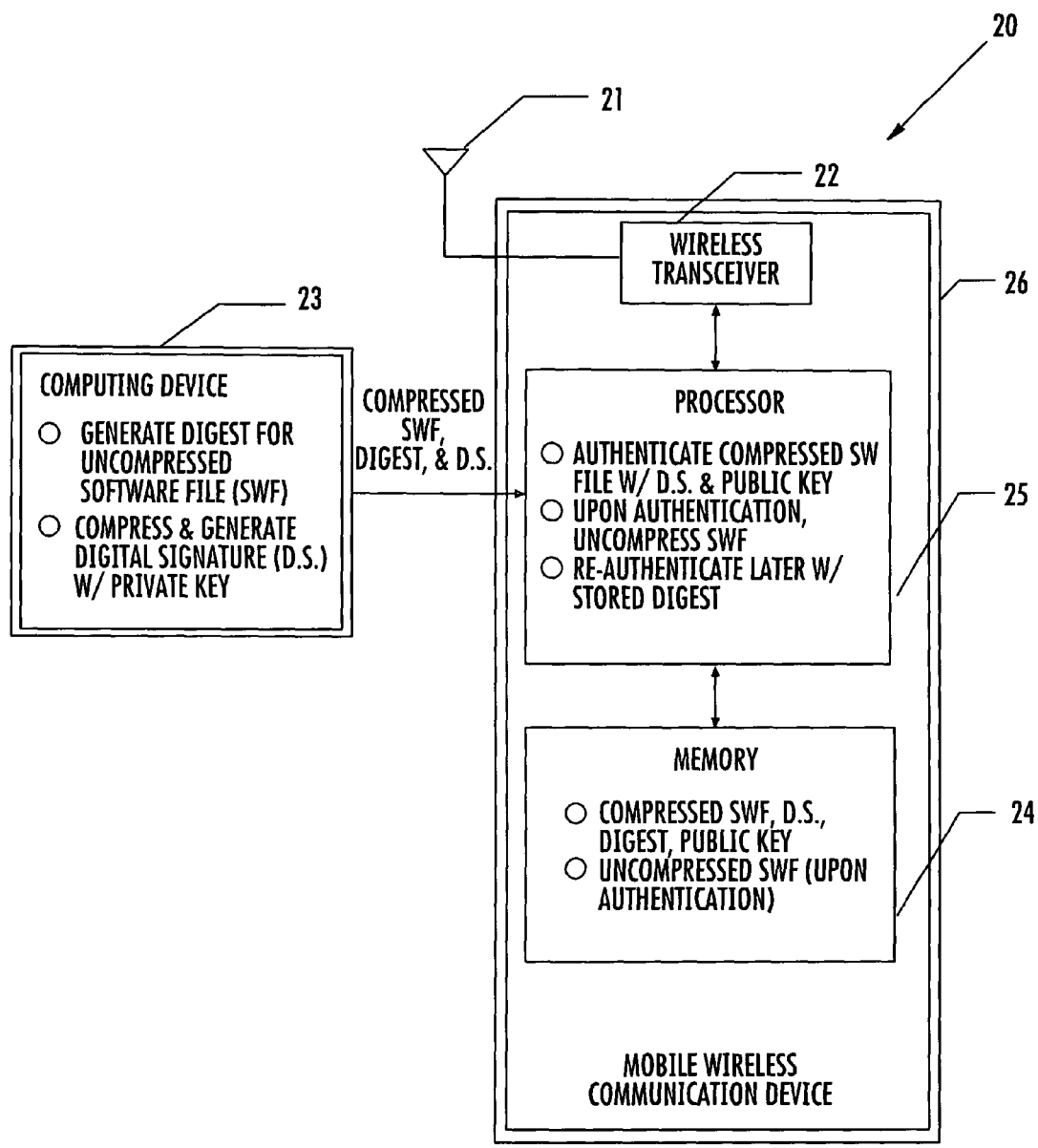
FIG. 2 is a schematic block diagram of the mobile wireless communications device of FIG. 1 and an associated computing device from which the mobile wireless communications device downloads software.

Referring initially to FIGS. 1 and 2, a mobile wireless communications device 20 in accordance with the present invention is first described. By way of example, the device 20 may be a software defined Joint Tactical Radio (JTR) set for use with the JTR System (JTRS) that operates in accordance with the Software Communications Architecture (SCA), as will be appreciated by those skilled in the art. The invention will first generally be described with respect to a JTR implementation, and more specific details of an exemplary JTR implementation will be discussed below with reference to FIG. 5. However, it will also be appreciated from the following description that the device 20 may be used in other applications as well, such as cellular communications and computer applications, for example.

The device 20 is preferably switchable between a plurality of wireless communications operating modes. In the case of a JTR, for example, such operating modes may include a Single-Channel Ground-Air Radio System (SINCGARS) mode, a HAVE QUICK mode, and a VULOS mode. Of course, the device 20 may be used with numerous other operating modes as well, as will be appreciated by those skilled in the art.

The device 20 illustratively includes an antenna 21, a wireless transceiver 22 connected to the antenna, and a memory 24. The device 20 also illustratively includes a processor 25 connected to the wireless transceiver 22 and cooperating therewith for performing wireless communications, as will be appreciated by those skilled in the art. The processor 25 is also illustratively connected to the memory 24 and may include one or more microprocessors and/or digital signal processors (DSPs), for example. A portable housing 26 may carry the antenna 21, wireless transceiver 22, and processor 25, as well as control knobs 27, 28 and a plug-in module 29.

Figure 3:
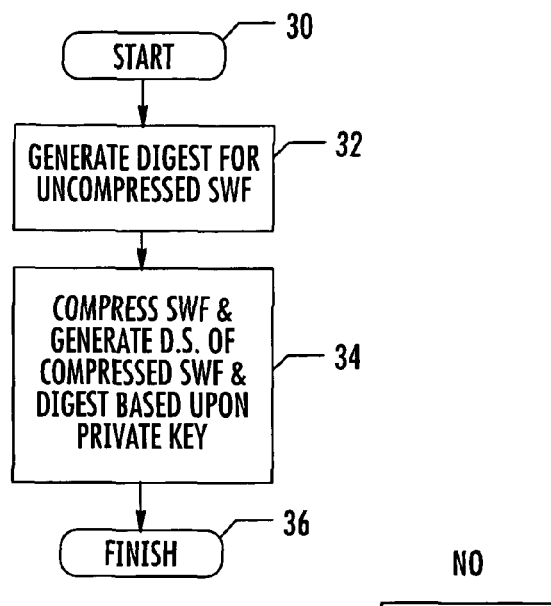
FIGS. 3 and 4 are schematic block diagrams illustrating method aspects of the present invention.
Figure 4:
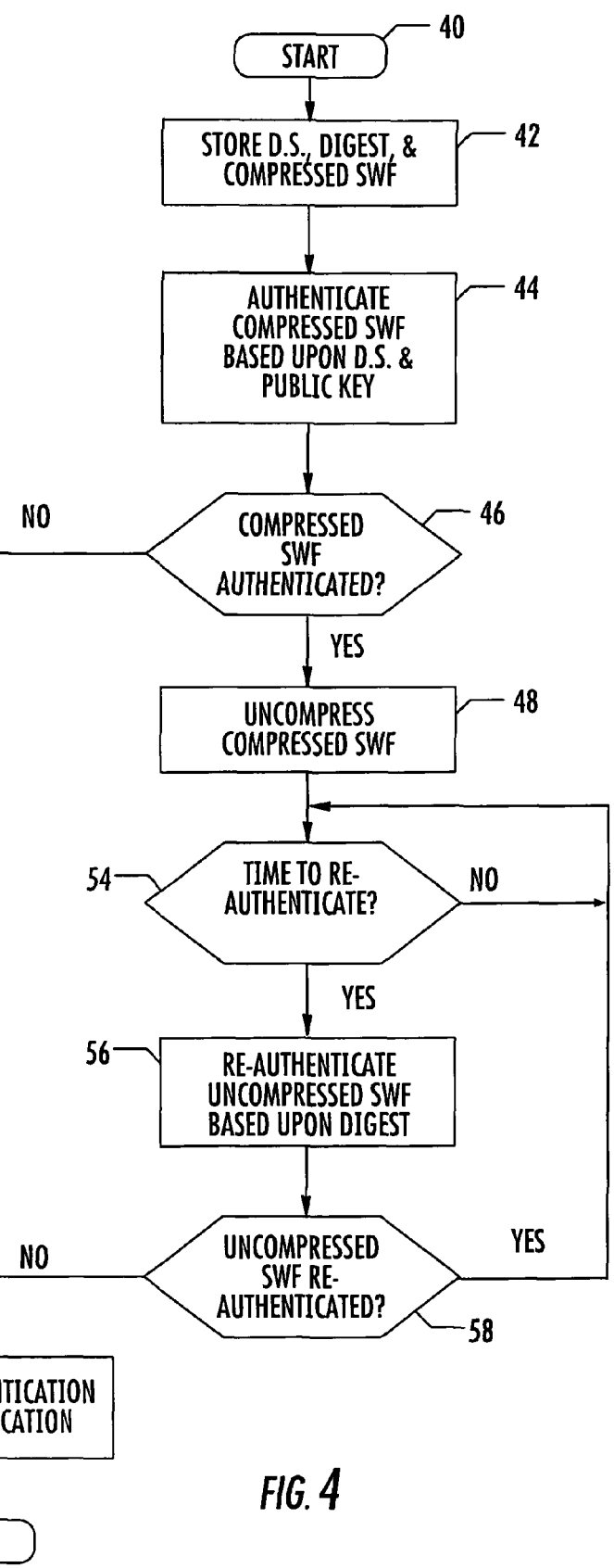

Referring now additionally to FIGS. 3 and 4, software installation and verification operations in accordance with the present invention performed by a computing device 23 and the device 20, respectively, are now described. The software file or components to be installed on the device 20 are provided by a computing device 23, which may be a computer at the device manufacturing facility used to download software to the device during the manufacturing/assembly process. By way of example, the software file(s) to be installed on the device 20 may be a radio frequency (RF) waveform files. Thus, for the exemplary operating modes noted above, SINCGARS, HAVE QUICK, and VULOS waveform files would be installed on the device 20. Other files that may be installed into the device 20 may include cryptographic files, operating system (OS) files, etc., as will be discussed further below.

The download of software from the computing device 23 to the device 20 illustratively takes place over a wired link (e.g., a USB cable, etc.) as illustrated in FIG. 2, although wireless data transfer via the antenna 21 and transceiver 22 may also be used for downloading in some embodiments. It should also be noted that the downloading of software may also take place after manufacturing/assembly, such as for updating or adding new software. As such, the computing device 23 may take other forms such as a personal computer, etc. It should also be noted that more than one computing device 23 may be used. For example, the software components may be created or generated on a first computing device, and then transferred from a second computing device via compact disk (CD), etc. to the device 20.

Referring first to FIG. 3, beginning at Block 30, the computing device 23 generates a digest of an uncompressed version of the software file to be installed on the device 20, at Block 32. That is, the digest is generated from the software file in the form it will take once installed on the device 20. By way of example, the digest of the uncompressed version of the software file may be generated based upon a one-way algorithm, such as a hashing algorithm. One exemplary hashing algorithm that may be used is the Secure Hash Algorithm SHA-1, as will be appreciated by those skilled in the art. Of course, other suitable one-way or hashing algorithms may also be used.

The digest created by a one-way algorithm such as a hash function is a unique "fingerprint" of the original input(s) that typically cannot be used to determine the original input. However, since the digest is unique to the input, if the input is changed so too will the digest. Thus, the digest for a given file can be re-generated at a later time and compared with the original digest for the file, and if the digests differ then the file has been changed or altered.

The computing device 23 also generates a compressed version of the software file, at Block 34. That is, the computing device 23 "packs" the file so that it may be more readily stored and transferred to the device 20. The software file may be compressed using various suitable data compression algorithms known to those skilled in the art. To provide still further security, the computing device 23 also generates a digital signature of the compressed software file and the digest based upon a private key (Block 34), thus concluding the illustrated method steps performed by the computing device 23, at Block 36. As will be appreciated by those skilled in the art, the private key is associated with a secure and trustworthy information source or provider, such as a manufacturer or software developer. It should be noted that the above-described steps of generating the digest, the digital signature, and compressing the software file may be performed on different devices or by different sources, although a single computing device 23 is shown for clarity of illustration. For example, the digest may be generated by the software developer, while the digital signature may be generated by a separate and secure certifying authority, as will be discussed further below.

An independent security certification service may provide verification of the source, and also provide copies of a public key corresponding to the private key to users who need to decrypt information encrypted using the private key. Since the private key is known only to the secure source, a user receiving a file purportedly from this source can deem the file to be trustworthy if the public key correctly decrypts this file. This is because the public key will only work to properly decrypt a file if it was actually encrypted with the corresponding private key. By way of example, one algorithm that may be used for generating the digital signature is the Digital Signal Algorithm (DSA) in accordance with the Digital Signal Standard (DSS), as will be appreciated by those skilled in the art, although other suitable algorithms may also be used.

Turning now to FIG. 4, beginning at Block 40, in one exemplary embodiment the processor 25 of the device 30 cooperates with the computing device 23 to download the compressed software file, the digest, and the digital signature of the compressed software file and store them in the memory 24, at Block 42. However, it should be noted that in some embodiments the compressed software file, digest, and digital signature may initially be stored on the memory 24 outside of the device 20, and the memory may then be inserted into the device. By way of example, the memory 24 may be a non-volatile memory such as a flash memory, although other suitable memories (EEPROMs, etc.) may also be used.

It should also be noted that while the memory 24 and processor 25 are illustrated as single components in FIG. 2 for clarity of reference, these components may include a plurality of different memories and processors. For example, different memories may be used for storing secure and non-secure data or files, as will be discussed further below. Moreover, different memories may be used for storing the software file, digest, etc. before authentication (e.g., RAM) and after authentication (e.g., flash).

Depending upon the given implementation, the public key that the processor 25 will use to decrypt the digital signature may be downloaded with the compressed software file, or at another time from a different source (e.g., a secure certifying authority). The processor 25 authenticates the compressed software file (and the digest) based upon the digital signature and the public key which, as noted above, corresponds to the private key used by the computing device 23 to generate the digital signature, as will be appreciated by those skilled in the art (Block 44). Upon authentication of the compressed software file, (i.e., if it is authenticated), at Block 46, the processor uncompresses (i.e., installs) the compressed software file, at Block 48.

Otherwise, if the compressed software file is not authenticated, then the compressed software file is deemed not to be from the expected source and thus is not uncompressed (i.e., installed) by the processor 25. In such case, an authentication failure notification may be generated for the user, such as in an installation log file or a visible/audible alert provided to a user through a human-machine interface (HMI), at Block 50, thus concluding the illustrated method (Block 52).

While the above-described security operations help to ensure that only software files from a trusted source will ever be installed on the device 20, in accordance with the invention still further measures are taken to help ensure that the software files are not altered or compromised after installation on the device. More particularly, the uncompressed software file is advantageously re-authenticated at a time after installation based upon the digest, at Blocks 54 and 56. The re-authentication is preferably performed by a secure, trusted source that stores the digest, as will be discussed further below. The re-authentication is performed by using the above-noted one-way algorithm (e.g., hashing algorithm) to again generate a new digest based upon the uncompressed file as stored on the device 20. Re-authentication may be performed "automatically" by the processor 25 on a schedule or pseudo-randomly, for example, or this may be done upon initiation by a user through an HMI.

If the new digest matches the previously stored digest that was downloaded from the computing device 23, then it can be determined with a high degree of probability that the uncompressed software file has not been changed or altered, as discussed above (Block 58). However, if the two digests are not the same, then the opposite is true and an authentication failure notification, etc., may be generated, as discussed above.

It will therefore be appreciated that the authentication/verification operations of the present invention advantageously may be used for authenticating software applications and the operating environment (i.e., platform) to maintain system integrity. This is in contrast to many prior art approaches such which are intended merely for validating data, for example.

Figure 5:
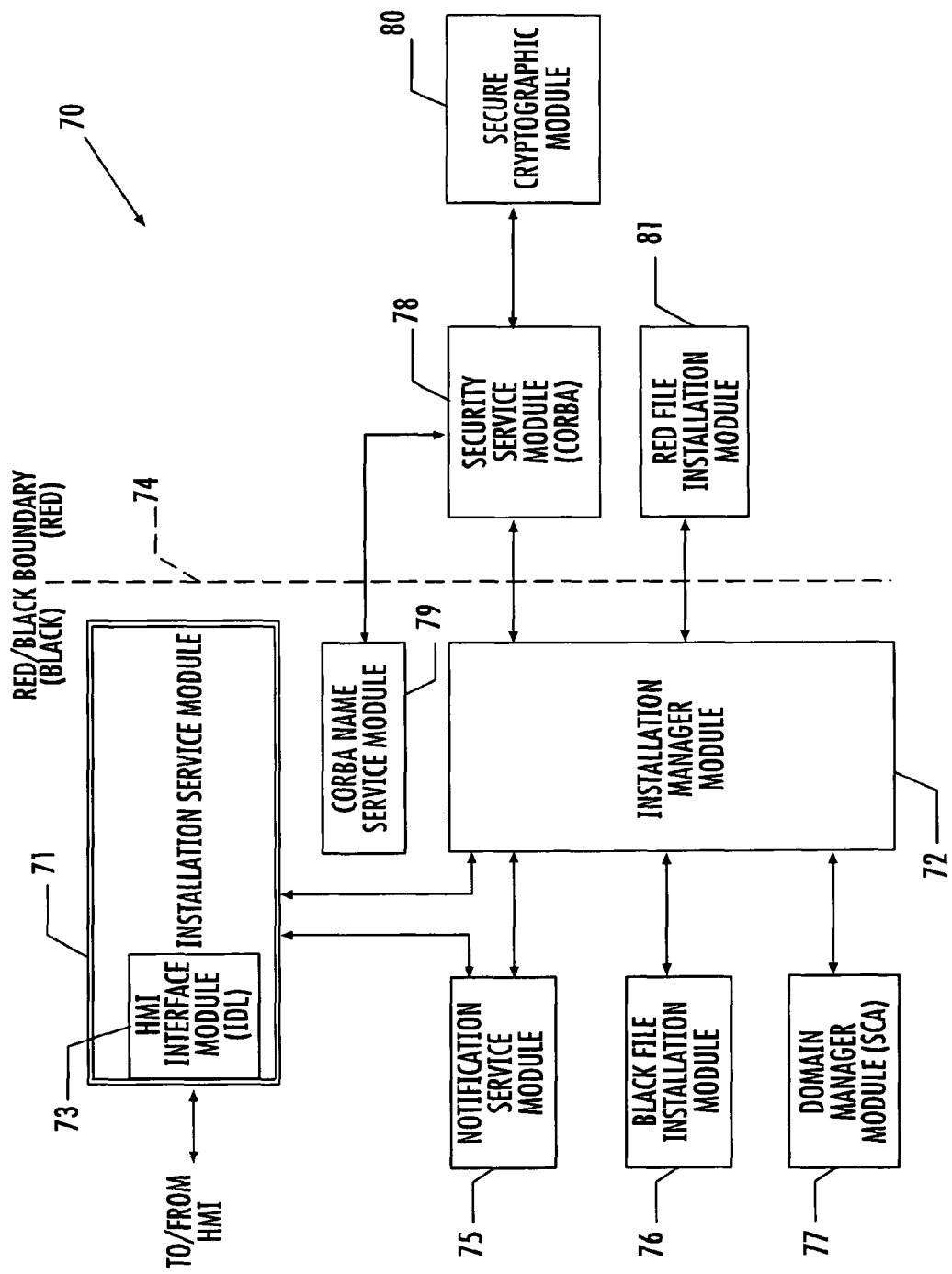
FIG. 5 is a schematic block diagram of a JTR device in accordance with the present invention.

Referring now to FIG. 5, the processing modules of an exemplary JTR 70 in accordance with the present invention are now described. As will be appreciated by those skilled in the art, the various processing modules of the JTR 70 may be implemented using a combination of software and hardware (e.g., microprocessor/DSP, memory) components. An installation service module 71 provides an interface between a user controlling the software installation process and an installation manager module 72 which manages the installation process. The installation service module 71 illustratively includes an HMI interface module 73 which may have its interface described by an Interface Definition Language (IDL), for example, as will be appreciated by those skilled in the art.

The installation service and manager modules 71, 72 are both located on the "black" (i.e., unclassified) side of a conceptual red/black boundary 74 of the JTR 70. The installation manager module 72 and the installation service module 71 both communicate with a notification service module 75 to inform a user of the status of a software installation through the HMI, for example. Further, the installation manager module 72 also interfaces with a black file installation module 76 to install unclassified software files once they have been authenticated. The JTR 70 also operates in accordance with SCA, and to this end the installation manager module 72 also interfaces with a domain manager module 77 that performs the requisite SCA functions, as will be appreciated by those skilled in the art.

The installation manager module 72 also interfaces with a security service module 78 on the "red" (i.e., secure or classified) side of the red/black boundary 74. Communication to the security service software module 78 is implemented via a Common Object Request Broker Architecture (CORBA). A corresponding CORBA name service module 79 is included on the red side of the red/black boundary 74 to facilitate establishing communication with the security service module 78. The security service module 78 provides the interface or gateway to a secure cryptographic module 80 also within the red portion of the JTR 70. Preferably, the secure cryptographic module 80 performs all of the above-described authentication and re-authentication procedures, and also stores secure authentication data such as the digest provided by the computing device 23.

To this end, the installation manager module 72 cooperates with the security service module 78 to pass the requisite items (e.g., compressed/uncompressed software file, digital signature, public key, digest) to the secure cryptographic module 80 for performing the authentication and/or re-authentication operations. By having all authentication/re-authentication operations performed by the secure cryptographic module 80, this helps to ensure the integrity of these operations. By way of example, the secure cryptographic module 80 may be a stand-alone hardware/software module that is certified by a third-party security source and installed in the JTR 70 so that the device performs all secure data operations in accordance with a given security level required by the third-party source. A red file installation module 81 also interfaces with the installation manager module 72 to uncompress or install red software files upon authentication thereof by the secure cryptographic module 80.

Exemplary radio software installation procedures will now be described in further detail. Radio software may include software running on the JTR 70, including radio waveforms and their associated plug-ins, software for the OS and system framework, as well as fill files for configuring RF waveforms. Installation is preferably a specific mode of the JTR 70. Users of the JTR 70 explicitly enter this mode for the purpose of installing new software files or components. Modes of the JTR 70 are preferably exclusive. That is, when the JTR 70 is installing new capabilities it is not performing other functions. For example, the user of the JTR 70 does not simultaneously communicate using a given waveform and install new radio capabilities, although this may be done in some implementations, if desired.

The installation mode is preferably intended to be used by operators that have the authority to install and remove application content from the radio platform. However, the installation mode may be used by any user to view what applications are installed on the JTR 70. The installation service is accessed through a client having access to the radio's HMI interface. For the installation service module 71 to function, it is assumed that the user will put the JTR 70 into the install mode by using a front panel display, for example (not shown), although other approaches may also be used.

The general process for installation of a file(s) is as follows. An installation package is created by the computing device 23 which includes a complete set of all the necessary files to be installed. With respect to mission fill files, the package includes only a single file. As noted above, a digital signature is created for the installation package (i.e., the uncompressed software file and digest) for validation prior to installation. The installation process generally includes: directing the installation package to a well-known directory in the radio; authenticating the file using the cryptographic module; checking that the package is acceptable (e.g., authenticating the package, making sure it has not already been installed, etc.); installing the package into the file system of the appropriate processor (for platform and waveform software, this would include the red and black side file systems, and for mission fill files, only the red side file system is affected); registering the software with the system (not applicable for mission fill files); and reporting the results to the user.

The installation service module 71 is a radio configuration plug-in module that runs within the context of system control and handles all of the user requests to install new radio components. The installation service module 71 publishes its object reference in the CORBA naming service module 79, and clients of the radio resolve the installation plug-in when they are interested in executing installation services.

Software that enters the JTR 70 through the installation mode is organized into three categories, namely platform software, waveform application, and mission fill files. The installation procedure for each of these file types varies somewhat. Platform software may include an initial program loader (IPL), image file systems (IFS), extended file system (EFS), and images (IMG). Generally speaking, platform software provides the underlying software to control the hardware on the radio, provides a Portable Operating System Interface (POSIX) compliant operating system, and provides an SCA-compliant framework for running applications (namely, waveforms). The JTR 70 may be configured such that installing platform software will erase all other software on the radio. Uninstalling platform software is preferably undefined behavior that a user will not be allowed to perform.

A waveform file or component is an application that runs on the EFS to perform certain communication functionality. There may be many waveforms installed on the JTR 70, as noted above. Installing or uninstalling a waveform should not affect any other waveform on the system. It should be noted that in some embodiments it may be preferable to install certain classified waveform or other files/components through a separate, dedicated secure interface to avoid passing such components through any "black" data path. Mission fill files provide specialized commands to configure a waveform to specific settings. Once the mission fill file is installed, it can be executed to configure the waveform, as will be appreciated by those skilled in the art.

The installation package preferably includes three major parts for a DSS/SHA-1 implementation. These are the DSS (SHA-256) signature that is generated by a signing utility using public and private keys. The size of the signature is sixty-four bytes. The signature is used to verify the validity of the package prior to installation. The next part is the SHA-1 hash generated by a utility in the make system. The SHA-1 hash is twenty bytes. As noted above, the SHA-1 hash is used to verify the validity of the software at some later time after installation, much like a digital fingerprint. The third part is a tar package including the software for the black side and red side processors.

The platform installation package is preferably prepared by the computing device 23 during compilation of the code according to the following process. The IPL, IFS, IMG, and EFS image binaries for the black side processor and red side processor are created. Then, the black side binaries are zipped and tarred into a file called plat-biop.tar. Further, the red side binaries are zipped and tarred into a file called plat-riop.tar. Moreover, the platform's appinfo.txt, which contains information describing the package, the plat-biop.tar file, and the plat-riop.tar file will be tarred into a platform_HH.F3.inst.tar file.

A SHA-1 hash digest of the platform software is then created. This involves creating one file including all the platform software concatenated in the following order: the black side IPL, IFS, IMG, EFS, followed by the red side IPL, IFS, IMG, and EFS. The concatenation is of the uncompressed images of the software file(s). The concatenated file is then sent through a preprocessor to be byte-swapped, and then a SHA-1 hash digest is created from the byte-swapped version. Lastly, the SHA-1 hash will be attached to the platform_HH.F3.inst.tar file to create a platform_HH.F3.inst.tar.sha1 file. In addition, the platform_HH.F3.inst.tar.sha1 file is signed using the DSS signing utility using a set of public and private keys. When signing the package for release (versus for engineering or testing use), a controlled public and private key pair is used, as further discussed above.

To perform a platform software install, once installation of a package has been initiated the following operations are performed. The file is sent through the security service module 78 to the secure cryptographic module 80 as noted above to authenticate the package by checking the digital signature against the package. If the signature is valid, the secure cryptographic module 80 will store the SHA-1 hash digest and return an index to the installation manager module 72. The installation manager module 72 will store the index to verify the file system at a later time.

Thereafter, all the waveforms currently installed on the JTR 70 are uninstalled to make room in memory (e.g., flash) file system to stage the platform software. The platform package is then uncompressed or unpacked into the flash file system, with the plat-biop.tar contents on the black side and the plat-riop.tar contents on the red side. Furthermore, a file is created that cues the system that a platform install should occur at power up, and the JTR 70 is rebooted. Upon reboot, the binary image files on the black side and red side will be installed.

Installation of individual waveform files is now described. Here again, there are three major parts to a waveform file package. These include the DSS(SHA-256) signature generated by the DSS signing utility (sixty-four bytes), the SHA-1 hash digest (twenty bytes), and tar package including the software for the black side and red side processors. The waveform installation package is prepared during code compilation according to the following process. The black side files are tarred into a file called wf-biop.tar, and then the file is compressed to create wf-biop.tar.gz. The red side binaries are each tarred into a file called wf-riop.tar, and then the file is compressed to create wf-riop.tar.gz. The waveform's appinfo.txt file, which includes information describing the package, the wf-biop.tar.gz file, and the wf-riop.tar.gz file will be tarred into a <waveform-name>.inst.tar file.

Moreover, the SHA-1 hash digest of the waveform software is also created. This involves creating one file including all the waveform software concatenated in the following order: the black side files in the order specified by the blackside validation.txt file followed by the red side files in the order specified by the red-side validation.txt file. The concatenated file is passed through a preprocessor to be byte-swapped, and then a SHA-1 hash digest is created from the byte-swapped version. Lastly, the SHA-1 hash is attached to the <waveform-name>.inst.tar file to create a <waveform-name>.inst.tar.sha1 file. As noted above, the <waveform-name>inst.tar.sha1 file is signed using the DSS signing utility using the set of public and private keys.

To perform a waveform software install, once installation of a package has been initiated the install service verifies that the waveform that is being installed does not currently reside on the JTR 70. If it does, the installation will abort and the user will be notified. Otherwise, the file is then sent through the security service module 78 to the secure cryptographic module 80 to authenticate the package by checking the signature against the package. If the signature is valid, the secure cryptographic module 80 stores the SHA-1 hash and returns an index to the installation manager module 72, which stores the index to verify the file system at a later time.

The waveform package is then uncompressed or unpacked into the flash memory file system, with the wf-biop.tar.gz contents on the black side and the wf-riop.tar.gz contents on the red side. The platform software and core framework are then notified of the presence of a new waveform. If the installation should fail, the install service preferably removes any files that were placed into the file system, notifies the requisite modules that the application should be uninstalled, and notifies the secure cryptographic module 80 that the SHA-1 hash digest should be deleted.

As noted above, the JTR 70 provides a user with the ability to verify or re-authenticate that the software installed on the radio's file systems has not been compromised or corrupted. The software verification test checks the installed waveforms against their associated SHA-1 hash digests, and the platform software against its SHA-1 hash digest. Once the software verification test is initiated, the JTR 70 makes a list of each installed waveform and then, for each waveform, provides each file through the security service module 78 to the secure cryptographic module 80 to calculate a SHA-1 hash digest therefor. Each SHA-1 hash digest is compared against the stored SHA-1 hash digest associated with that waveform. Similarly, the entire image for each portion of the platform software is also provided through the security service module 78 to the secure cryptographic module 80 to calculate a SHA-1 hash digest therefor, and the calculated hash is compared against the SHA-1 hash associated with the platform software. It should be noted, however, that rather than re-authenticating all of the waveform and platform files on the JTR 70, in some implementations the JTR may be configured to allow a user to verify only selected files, if desired.

If an inconsistency in the waveform or platform software is found, the secure cryptographic module 80 invalidates the associated SHA-1 hash digest, the test aborts, and the user is notified. From that point onward, the radio will not pass ciphertext (i.e., classified) traffic. To restore the full functionality of the radio, the user is required to uninstall or reinstall the invalidated software.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A mobile wireless communications device comprising:

a housing;

an antenna carried by said housing;

a wireless transceiver carried by said housing and connected to said antenna;

at least one memory for storing a compressed radio frequency (RF) waveform software file, a first digest of an uncompressed version of the RF waveform software file, and a digital signature of the compressed RF waveform software file and the first digest, the digital signature being generated based upon a private key; and a processor carried by said housing and cooperating with said wireless transceiver for performing wireless communications, said processor also cooperating with said at least one memory for authenticating the compressed RF waveform software file based upon the digital signature and a public key corresponding to the private key, upon authentication, uncompressing the compressed RF waveform software file, generating a second digest based upon the uncompressed RF waveform software file, and re-authenticating the uncompressed RF waveform software file at pseudo-random times after installation based upon comparing the first digest with the second digest.

2. The mobile wireless communications device of claim 1 wherein the first and second digests of the uncompressed version of the RF waveform software file are generated based upon a one-way algorithm.

3. The mobile wireless communications device of claim 1 wherein said processor comprises a secure cryptographic module for performing the authentication and re-authentication.

4. A mobile wireless communications device comprising:
a housing;
an antenna carried by said housing;
a wireless transceiver carried by said housing and connected to said antenna;
at least one memory for storing a compressed radio frequency (RF) waveform file, a first digest of an uncompressed version of the RF waveform file generated based upon a one-way hashing algorithm, and a digital signature of the compressed RF waveform file and the first digest, the digital signature being generated based upon a private key; and
a processor carried by said housing and cooperating with said wireless transceiver for performing wireless communications, said processor also cooperating with said at least one memory for
authenticating the compressed RF waveform file based upon the digital signature and a public key corresponding to the private key,
upon authentication, uncompressing the compressed RF waveform file,
generating a second digest based upon the uncompressed RF waveform software file, and
re-authenticating the uncompressed RF waveform file at pseudo-random times after installation based upon comparing the first digest with the second digest.

5. The mobile wireless communications device of claim 4 wherein said processor comprises a secure cryptographic module for performing the authentication and re-authentication.

6. A method for installing and verifying software on a mobile wireless communications device comprising:
storing a compressed radio frequency (RF) waveform software file, a first digest of an uncompressed version of the RF waveform software file, and a digital signature of the compressed RF waveform software file and the first digest, the digital signature being generated based upon a private key at the mobile wireless communications device;
authenticating the compressed RF waveform software file based upon the digital signature and a public key corresponding to the private key;
upon authentication, uncompressing the compressed RF waveform software file;
generating a second digest based upon the uncompressed RF waveform software file; and
re-authenticating the uncompressed RF waveform software file at pseudo-random times after installation based upon comparing the first digest with the second digest.

7. The method of claim 6 wherein the first and second digests of the uncompressed version of the RF waveform software file are generated based upon a hashing algorithm.

8. A software installation and verification method comprising:
at a first computing device
generating a first digest for an uncompressed radio frequency (RF) waveform software file, and
compressing the RF waveform software file and generating a digital signature of the compressed RF waveform software file and the first digest, the digital signature being based upon a private key; and
at a second computing device
storing the digital signature, the first digest, and the compressed software file,
authenticating the compressed RF waveform software file based upon the digital signature and the public key,
upon authentication, uncompressing the compressed RF waveform software file,
generating a second digest based upon the uncompressed RF waveform software file, and
re-authenticating the uncompressed RF waveform software file at pseudo-random times after installation based upon comparing the first digest with the second digest.

9. The method of claim 8 wherein generating the first and second digests comprises generating the first and second digests of the uncompressed version of the RF waveform software file based upon a hashing algorithm.

10. A mobile wireless communications device comprising:
a housing;
an antenna carried by said housing;
a wireless transceiver carried by said housing and connected to said antenna;
at least one memory for storing a compressed software file, a first digest of an uncompressed version of the software file, and a digital signature of the compressed software file and the first digest, the digital signature being generated based upon a private key; and
a processor carried by said housing and cooperating with said wireless transceiver for performing wireless communications, said processor also cooperating with said at least one memory for
authenticating the compressed software file based upon the digital signature and a public key corresponding to the private key,
upon authentication, uncompressing the compressed software file,
generating a second digest based upon the uncompressed software file, and
re-authenticating the uncompressed software file at pseudo-random times after installation based upon comparing the first digest with the second digest.

11. The mobile wireless communications device of claim 10 wherein the first and second digests of the uncompressed version of the software file are generated based upon a one-way algorithm.

12. The mobile wireless communications device of claim 11 wherein the one-way algorithm comprises a hashing algorithm.

13. The mobile wireless communications device of claim 10 wherein the software file comprises a cryptographic file.

14. The mobile wireless communications device of claim 10 wherein the software file comprises an operating system (OS) file.

* * * * *